United States Patent [19]

Yogo et al.

[11] Patent Number: 5,393,132
[45] Date of Patent: Feb. 28, 1995

[54] BRAKE CONTROL SYSTEM AND RESTRICTION ADJUSTING VALVE FOR VEHICLES

[75] Inventors: Kazutoshi Yogo, Nagoya; Masuhiro Kondo, Chiryu; Hideo Wakata, Nagoya, all of Japan

[73] Assignee: Nippondenso Co., Ltd., Kariya, Japan

[21] Appl. No.: 62,166

[22] Filed: May 17, 1993

Related U.S. Application Data

[63] Continuation of Ser. No. 721,294, Jun. 26, 1991, abandoned.

[30] Foreign Application Priority Data

Jun. 29, 1990 [JP] Japan .................................. 2-173735

[51] Int. Cl.$^6$ .............................................. B60T 8/36
[52] U.S. Cl. .............................. 303/116.1; 303/119.2; 251/129.07; 251/129.15
[58] Field of Search ............... 303/119.2, 84.1, 84.2, 303/113.1, 113.2, 116.1; 251/129.02, 129.08, 129.15, 129.07

[56] References Cited

U.S. PATENT DOCUMENTS

| | | | |
|---|---|---|---|
| 3,606,241 | 9/1971 | Bornholdt | 251/129.07 X |
| 3,877,760 | 4/1975 | Cole et al. | 303/119 SV |
| 4,619,289 | 10/1986 | Tsuru et al. | 303/119 SV X |
| 4,690,374 | 9/1987 | Polach et al. | 251/129.02 |
| 4,852,852 | 8/1989 | Toshio et al. | 251/129.07 |
| 4,898,434 | 2/1990 | Kohno et al. | 303/119 SV |
| 4,919,497 | 4/1990 | Kaes | 303/119 SV |
| 4,987,923 | 1/1991 | Tackett | 303/119 SV X |
| 5,076,538 | 12/1991 | Mohr et al. | 303/119 SV X |

FOREIGN PATENT DOCUMENTS 51-6308 2/1976 Japan .

*Primary Examiner*—Robert J. Oberleitner
*Assistant Examiner*—Lee W. Young
*Attorney, Agent, or Firm*—Cushman, Darby & Cushman

[57] ABSTRACT

A brake control system for a motor vehicle which is equipped with a running state detector for detecting a running state of the motor vehicle so as to adjust a braking pressure in a wheel-braking cylinder of the motor vehicle in accordance with the detected vehicle running state. The brake control system has a first restriction adjusting valve provided between a hydraulic pressure generating source and the wheel-braking cylinder for adjusting the braking pressure to be supplied from the hydraulic pressure generating source to the wheel-braking cylinder, and a second restriction adjusting valve provided between the wheel-braking cylinder and a reservoir for adjusting a braking liquid to be discharged from the wheel-braking cylinder to the reservoir. Also included in the system is a control unit for outputting control signals to the first and second restriction adjusting valves so as to control the braking pressure in the wheel-braking cylinder in accordance with the detected vehicle running state. This arrangement allows setting of the braking hydraulic pressure increasing and decreasing speeds so as to permit a smooth brake control operation.

8 Claims, 4 Drawing Sheets

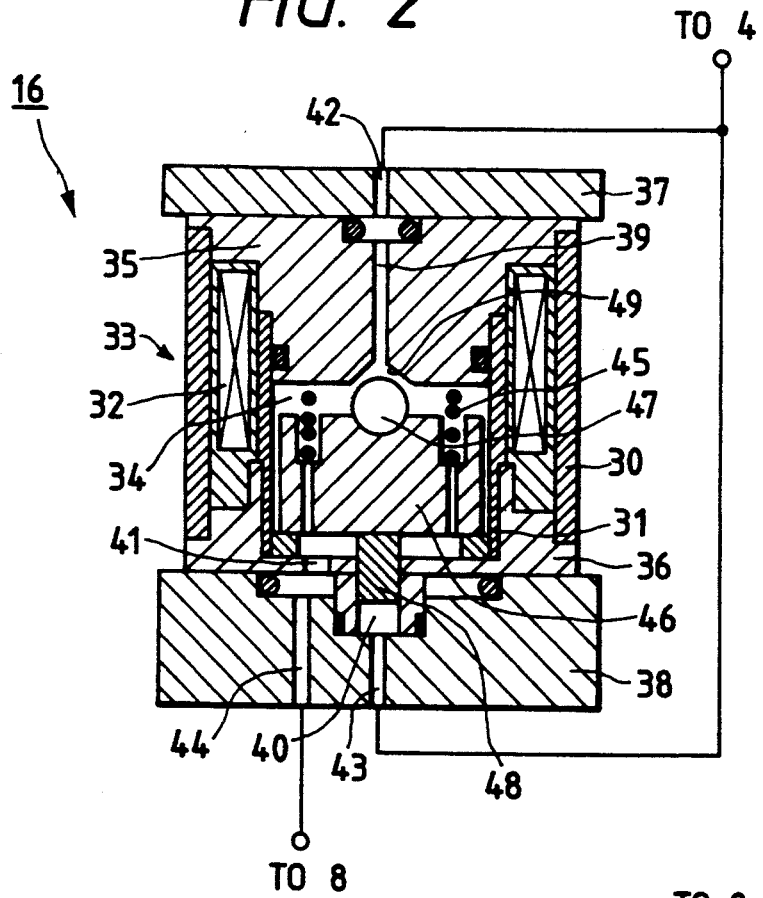
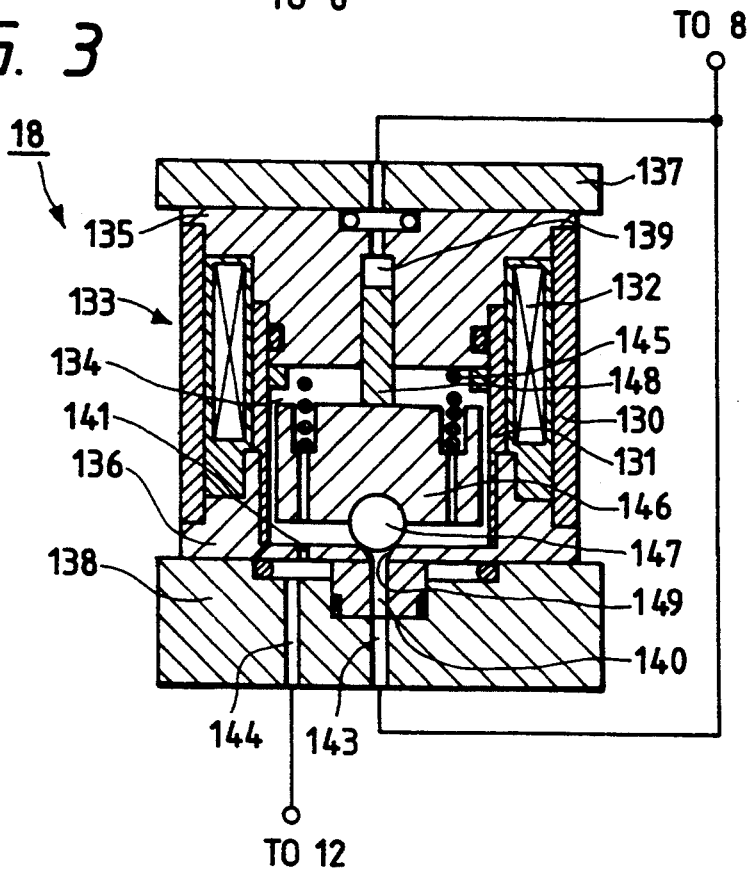

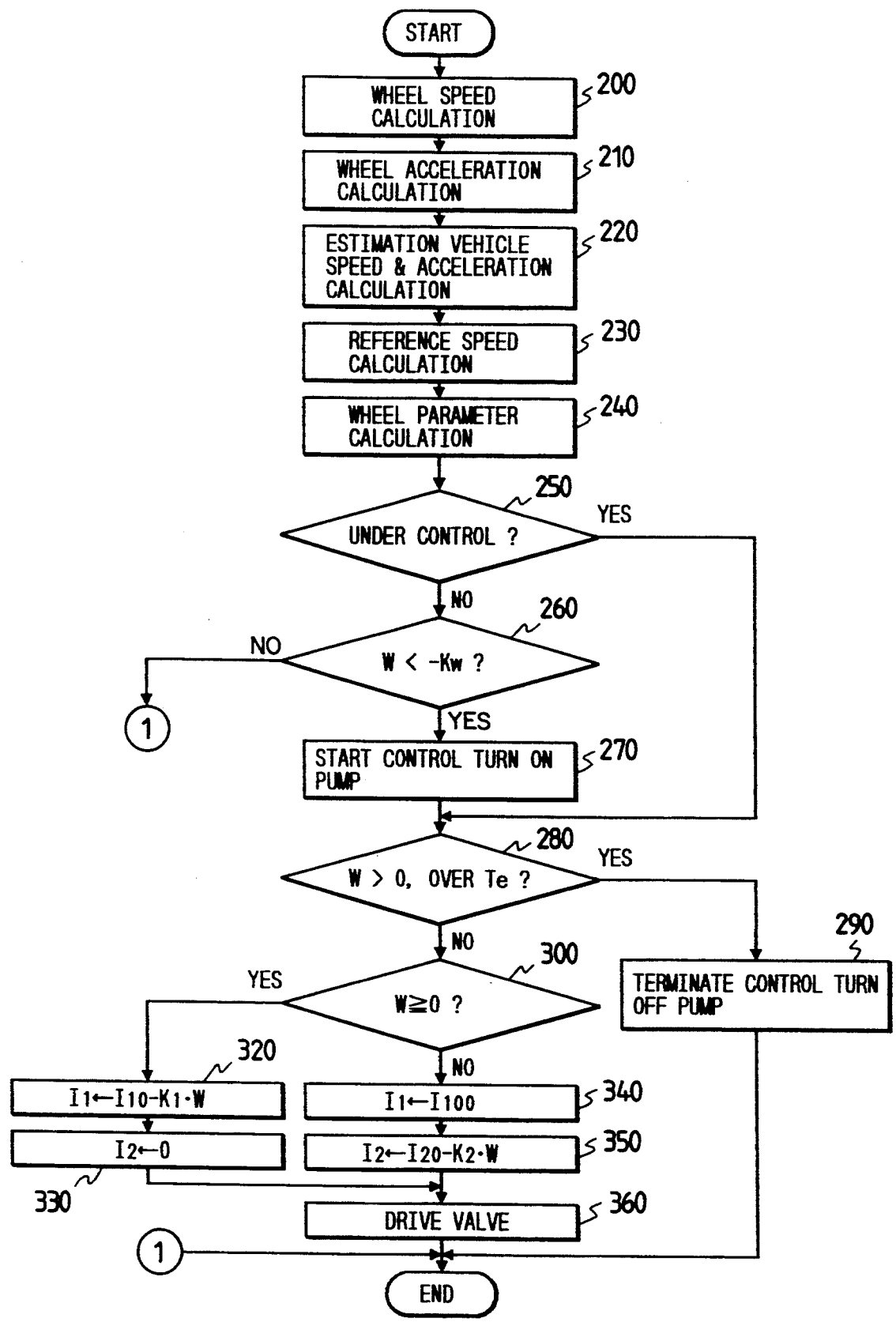

BRAKE CONTROL SYSTEM AND RESTRICTION ADJUSTING VALVE FOR VEHICLES

This is a continuation of application Ser. No. 07/721,294, filed on Jun. 26, 1991, now abandoned.

BACKGROUND OF THE INVENTION

The present invention relates to a brake control system for use in motor vehicle which is arranged so as to perform the brake control by increasing and decreasing the braking hydraulic pressure in the wheel-braking cylinder, and further to a restriction adjusting valve suitable for the brake control.

Conventional vehicle brake control systems such as an anti-skid control apparatus are generally arranged to adjust the braking hydraulic pressure with a switching operation between pressure-increasing, pressure-maintaining and pressure-decreasing being performed using a three-position valve or two-port and two-position valve. In addition, as disclosed in the Japanese Patent Publication No. 51-6308, it is also known that the pressure-increasing and pressure-decreasing can be slowly effected under pulse-type braking hydraulic pressure control.

There is a problem which arises with such a conventional braking hydraulic pressure control system, however, in that severe pulsation of the hydraulic pressure can occur due to a shock phenomenon caused by the switching operation between the pressure-increasing, pressure-maintaining and pressure-decreasing whereby vibration is conveyed through a suspension and others to the vehicle body. This gives a discomfort sensation to the vehicle driver. Moreover, this shock phenomenon also occurs at the master cylinder side so that the vibration is transmitted to the braking pedal to similarly give a discomfort sensation to the vehicle driver.

SUMMARY OF THE INVENTION

It is therefore an object of the present invention to provide a brake control system for motor vehicles which is capable of freely controlling the braking hydraulic pressure increasing and decreasing speeds so as to execute brake control without giving a discomfort sensation to the vehicle driver, and further to provide a restriction adjusting valve suitable therefor.

According to the present invention there is provided a brake control system for a motor vehicle which is equipped with a running state detector for detecting a running state of the motor vehicle so as to adjusting a braking pressure in a wheel-braking cylinder of the motor vehicle in accordance with the detected vehicle running state. The brake control system comprises a first restriction adjusting valve provided between a hydraulic pressure generating source and the wheel-braking cylinder for adjusting the braking pressure to be supplied from the hydraulic pressure generating source to the wheel-braking cylinder and a second restriction adjusting valve provided between the wheel-braking cylinder and a reservoir for adjusting a braking liquid to be discharged from the wheel-braking cylinder to the reservoir. Also included in the system is a control unit for outputting control signals to the first and second restriction adjusting valves so as to control the braking pressure in the wheel-braking cylinder in accordance with the detected vehicle running state. This arrangement allows desirably setting the braking hydraulic pressure increasing and decreasing speeds so as to permit a smooth brake control operation.

At least one the restriction adjusting valves comprises: a housing having a first communication hole into which an operating oil flows, an introduction passage into which the operating oil is introduced and a second communication hole from which the operating oil flows out; a sliding member provided in the inside of the housing so as to be slidable and having a valve body for opening and closing an end portion of the first communication hole and further having a pressure-receiving portion which receives the operating oil introduced into the introduction passage; a spring member for biasing the sliding member in a direction that the valve body tightly closes or release the end portion of the first communication hole; and electromagnetic force generating means for generating an electromagnetic force in correspondence with an energization current value, the electromagnetic force biasing the valve body in a direction opposite to the biasing direction of the spring member.

In the case that said restriction adjusting valve is provided between the hydraulic pressure generating source and the wheel-braking cylinder, the sliding member is biased by the spring member in a direction that said valve body releases the end portion of the first communication hole. Further, in the case that the restriction adjusting valve is provided between the wheel-braking cylinder and the reservoir, the sliding member is biased by the spring member in a direction that the valve body tightly closes the end portion of the first communication hole.

BRIEF DESCRIPTION OF THE DRAWINGS

The object and features of the present invention will become more readily apparent from the following detailed description of the preferred embodiments taken in conjunction with the accompanying drawings in which:

FIG. 2 is a cross-sectional view showing an arrangement of a restriction adjusting valve to be provided in a high-pressure side hydraulic passage;

FIG. 3 is a cross-sectional view illustrating an arrangement of a restriction adjusting valve to be provided in a low-pressure side hydraulic passage;

FIG. 4 is a flow chart for describing the anti-skid control to be executed on the basis of the embodiment of this invention.

DETAILED DESCRIPTION OF THE INVENTION

Figure 1:
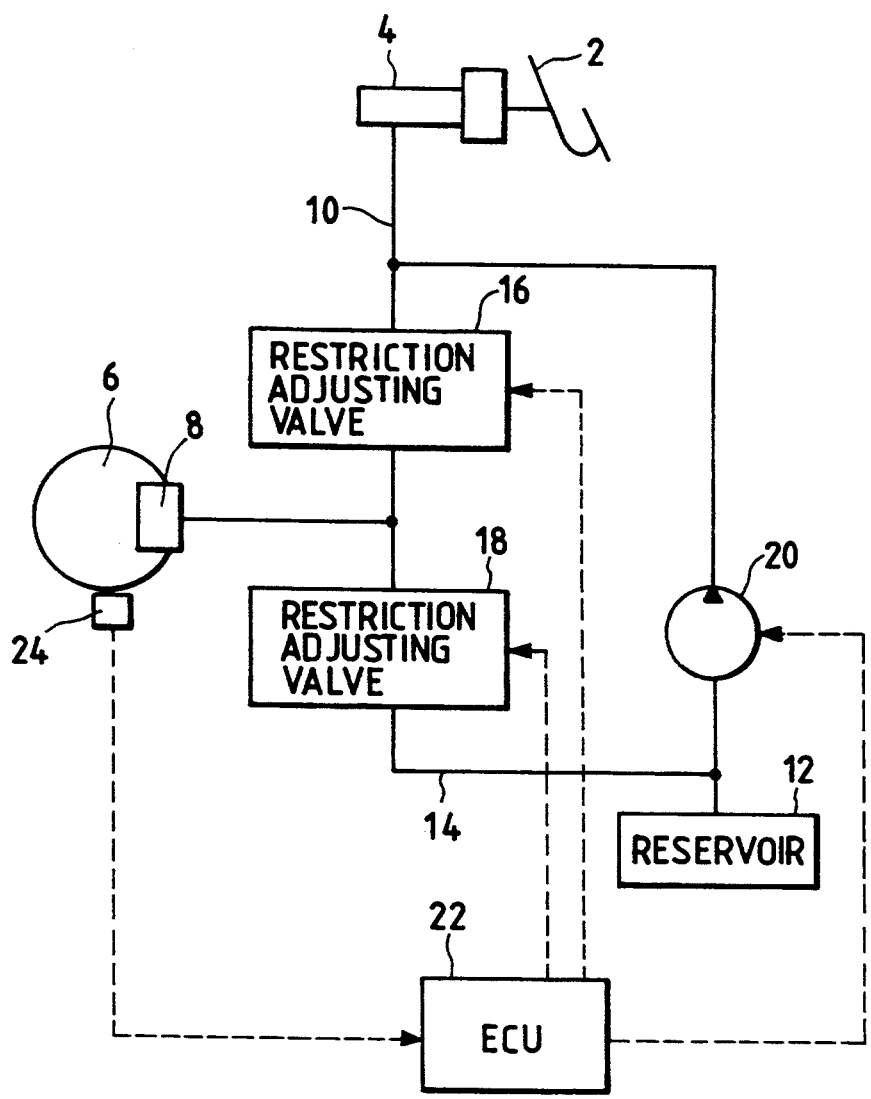
FIG. 1 is a schematic diagram showing an arrangement of an anti-skid control system into which an embodiment of this invention is incorporated.

Referring now to FIG. 1, there is schematically illustrated an anti-skid control system including an embodiment of the present invention which is incorporated into a motor vehicle. Here, only the braking control system for one wheel is illustrated for simplifying the description. Generally, such a control system is provided for each of the wheels.

In FIG. 1, a restriction adjusting valve 16 is provided in a high-pressure side hydraulic passage 10 for connection between a master cylinder 4, which generates a hydraulic pressure in correspondence with the depressing amount of a braking pedal 2 due to the vehicle driver and a wheel-braking cylinder 8, which applies a braking force to a wheel 6. Another restriction adjusting valve 18 is also provided in a low-pressure side hydraulic passage 14 for coupling between the wheel-braking cylinder 8 and a reservoir 12. On the upstream side of the restriction adjusting valve 16 of the high-pressure side hydraulic passage 10, a pump 20 supplies high-pressure braking oil from the reservoir 12. The pump 20 and the restriction adjusting valves 16, 18 are respectively driven under the control of an electronic control unit (which will be referred hereinafter to as an ECU) 22 which may be constructed by a known microcomputer comprising a central processing unit (CPU), a read-only memory (ROM), a random access memory (RAM) and others.

The ECU 22 is arranged so as to detect the slipping state of the wheel 6 at the time of the braking operation of the motor vehicle on the basis of the detection signal to be outputted from a wheel speed sensor 24, which senses the rotational speed of the wheel 6, and the detection signals to be output from wheel speed sensors which sense the rotational speeds of the other wheels of the motor vehicle. In response to the occurrence of the slip, the ECU 22 drives the pump 20 and the restriction adjusting valves 16, 18 to control the braking hydraulic pressure within the wheel-braking cylinder 8 for adequate execution of the anti-skid control.

The restriction adjusting valve 16 provided in the high-pressure hydraulic passage 10 is arranged as illustrated in FIG. 2. In FIG. 2, the restriction adjusting valve 16 is composed of a cylindrical housing 33 including a larger-sized cylinder 30 and a smaller-sized cylinder 31 where there is provided a coil 32 acting as an electromagnetic force generating means. Also included in the valve 16 are two inner housings 35 and 36 for sealing the hollow portion of the cylindrical housing 33 from both the end portions thereof so as to form an oil chamber 34 and two outer housings 37 and 38 respectively provided at the outsides of the two inner housings 35 and 36.

At the central portion of the inner housing 35 disposed at the upper side of the oil chamber 34 there is formed a communication hole 39 for the communication between the oil chamber 34 and the master-cylinder 4 side hydraulic passage 10. In the inner housing 36 disposed at the lower side of the oil chamber 34 there is formed a communication hole 40 for the communication to the master-cylinder 4 side hydraulic passage which is positioned to be in opposed relation to the above-mentioned communication hole 39. Further, in the inner housing 36 there is also formed a communication hole 41 for the communication between the oil chamber 34 and the wheel-braking cylinder 8 side hydraulic passage 10. Here, in the outer housings 37 and 38 disposed at the outsides of the inner housings 35 and 36 there are formed coupling holes 42, 43 and 44 which are respectively coupled to the communication holes 39, 40 and 41.

Furthermore, in the oil chamber 34 there is provided an armature 46 which is biased downwardly by means of a spring 45 acting as a biasing member. The armature 46 is arranged to be biased upwardly by an electromagnetic force of the coil 32 due to the energization. At the central and upper portion of the armature 46 there is provided a ball 47 acting as a valve body for opening and closing the opening end portion of the communication hole 39 in accordance with the movement of the armature 46. At the central lower portion of armature 46 there is provided a spool 48 which is slidably engaged or fitted with the communication hole 40. Further, at the opening end portion of the communication hole 39 with which the ball 47 contacts by the upward movement of the armature 46 there is formed a conical seat portion 49 whereby the ball 47 surely functions. Here, this seat portion 49 is arranged so that the reception area of the high-pressure oil to be applied from the communication hole 39 side becomes equal to the reception area of the high-pressure oil to be applied from the communication hole 40 side when the ball 47 comes into contact therewith.

In the restriction adjusting valve 16 thus arranged, the force that the armature 46 receives is cancelled with the high pressure to be supplied from the master cylinder 4 or pump 20 side whereby the position of the armature 46 is determined by the downward biasing force due to the spring 45 and the upward biasing force due to the electromagnetic force caused by the energization to the coil 32. Thus, in the restriction adjusting valve 16, increasing the energization current to the coil 32 allows the contact of the ball 47 with the seat portion 49 so as to shut the hydraulic passage 10, and changing the energization current thereto permits freely setting the position of the ball 47 with respect to the seat portion 49, i.e., the flow passage area between the communication hole 39 and the oil chamber 34. In other words, the control of the energization current to the coil 32 can adjust the flow area of the hydraulic passage 10 so as to control the oil amount which enters into the wheel-braking cylinder 8.

On the other hand, the restriction adjusting valve 18 provided in the low-pressure side hydraulic passage 14 is arranged as illustrated in FIG. 3. In FIG. 3, in this restriction adjusting valve 18, a spool 148 is disposed at the central and upper portion of an armature 146 and arranged to be slidably engaged with a communication hole 139 of an inner housing 135 provided at the upper side of an oil chamber 134. Further a ball 147 is provided at the central lower portion of the armature 146. A seat portion 149 with which the ball 147 contacts is provided at the side of a communication hole 140 of another inner housing 136, which is disposed at the lower side of the oil chamber 134. The hydraulic passage 14 is closed by the biasing force of a spring 145 and opened by the upward movement of the armature 146 due to the electromagnetic force caused by the energization to a coil 132. The other features of this restriction adjusting valve 18 are similar to those of the first-described restriction adjusting valve 16. In this restriction adjusting valve 18, when cutting the energization to the coil 132, the ball 147 comes into contact with the seat portion 149 so as to shut the hydraulic passage 14. The control of the energization current to the coil 132 allows adjusts the flow area of the hydraulic passage 14 to control the oil amount to be discharged from the wheel-braking cylinder 8 toward the reservoir 12. Since the other parts of the restriction adjusting valve 18 are arranged with substantially the similar structure to the above-described restriction adjusting valve 16, the description thereof will be omitted for brevity. The corresponding parts are marked with the numerals obtained by respectively adding 100 to the numerals used in FIG. 2.

Secondly, the anti-skid control process to be executed by the ECU 22 will be described hereinbelow with reference to the flow chart of FIG. 4. Here, this process is executed at a predetermined time interval. In FIG. 4, the anti-skid control process starts with a step 200 to calculate the wheel speed Vw on the signal from the wheel speed sensor 24, then followed by a step 210 to calculate the wheel acceleration αw. A subsequent step 220 is provided in order to calculate the estimation speed Vb of the motor vehicle and the acceleration αb thereof on the basis of the signal from the wheel speed sensor 24 and the signals from wheel speed sensors (not shown) for the other wheels. In step 230 a reference speed Vs is calculated on the basis of the estimation vehicle speed Vb obtained in the previous step 220. The reference speed Vs is used to decide that the wheel is in the locking tendency. More specifically, the estimation vehicle speed Vb is multiplied by Ko (for example, 0.7 to 0.95) to obtain a speed corresponding to the target slip ratio and the reference speed Vs is calculated in accordance with the following equation (1), i.e., subtracting an offset speed Vo from the obtained speed (Ko·Vb).

$$Vs = Ko \cdot Vb - Vo \tag{1}$$

Here, the subtraction of Vo from Ko·Vo is for providing the speed difference higher than the offset speed Vo between the estimation vehicle speed Vb and the reference speed Vs even if the estimation vehicle speed Vb becomes low.

A subsequent step 240 is executed so as to calculate a parameter W representative of the locking tendency of the wheel 6 (which will be referred hereinbelow to as a wheel parameter) in accordance with the following equation (2) on the basis of the estimation vehicle acceleration αb and the reference speed Vs obtained in the previous steps 220 and 230.

$$W = A \cdot (Vw - Vs) + B \cdot (\alpha w - \alpha b) \tag{2}$$

Here, in this equation (2) characters A and B are positive constants. The wheel parameter W to be obtained in accordance with the equation (2) indicates that the wheel 6 is not in the locking tendency when $W \geq 0$ and that it is in the locking tendency when $W < 0$, and the absolute value of the wheel parameter W is indicative of the strength of the locking tendency.

The next step 250 is provided in order to check whether the braking hydraulic pressure is now in the controlled state, that is, to check whether the anti-skid control execution has actually started. If started, the control goes to a step 280, and if not started, the control goes to a step 260. The step 260 is for comparing the wheel parameter W obtained in the step 240 with a control start level $-Kw$ (Kw: positive constant) so as to decide the locking tendency of the wheel 6. If $W < -Kw$, the control advances to a step 270 to drive (turn ON) the pump 20 to start the anti-skid control, then followed by a step 280. On the other hand, if $W \geq -Kw$ in the step 260, the process is once interrupted under the decision that the wheel 6 is not in the locking tendency.

In the step 280, it is checked whether the state that the wheel parameter W is above 0 continues for a time longer than Te sec. (for example, 0.5 to 2 sec.). If the answer of the step 280 is affirmative, under the decision that the locking tendency of the wheel 6 is completely suppressed, the control goes to a step 290 to turn OFF the pump 20 and to stop the energization of the restriction adjusting valves 16 and 18 (which are in the energized state during the control), thereby terminating the control.

On the other hand, if the answer of the step 280 is negative, under the decision that the lock of the wheel 6 is not yet suppressed, the control goes to a step 300 to check whether the wheel parameter W is equal to or above 0, that is, check whether the wheel 6 is in the non-locked state. If $W \geq 0$ in the step 300 representative of no locking tendency of the wheel 6, the control proceeds to a step 320 in order to calculate the current amount I1 to be supplied to the coil 32 of the restriction adjusting valve 16 in accordance with the following equation (3), then followed by a step 330 to set to 0 the current amount I2 to be supplied to the coil 132 of the restriction adjusting valve 18.

$$I1 = I10 - K1 \cdot W \tag{3}$$

where K1 is a positive constant, and I10 represents the current value of the coil 32 when the ball 47 of the armature 46 is positioned to come into contact with the seat portion 49.

More specifically, in the step 320, the subtraction of K1·W from the current value I10 is to calculate the current amount I1 for the separation of the ball 47 from the seat portion 49 by a predetermined amount corresponding to the strength of the locking tendency of the wheel 6. In other words, the introduction speed of the oil into the wheel-braking cylinder 8, i.e., the pressure-increasing speed of the braking hydraulic pressure is controlled by enlarging the flow area of the hydraulic passage 10 in accordance with the strength of the locking tendency of the wheel 6. Further, in the step 330, the setting of the energizing current amount I2 to the coil 132 of the restriction adjusting valve 18 to zero is because it is not required to discharge the oil from the wheel-braking cylinder 8 by opening the hydraulic passage 14 in the case that the wheel 6 is not in the locking tendency. That is, by setting the current I2 to zero, coil 132 is not energized, and the ball 147 comes into contact with the seat portion 149 by means of the biasing force of the spring 145 shutting passage 14.

On the other hand, if in the step 300 $W < 0$ indicative of the locking tendency of the wheel 6, a step 340 follows to set the current amount I1, to be supplied to the coil 32 of the restriction adjusting valve 16, to a predetermined value I100 (I100 > I10), and then followed by a step 350 to calculate the current amount I2 for the energization of the coil 132 of the restriction adjusting valve 18 in accordance with the following equation (4).

$$I2 = I20 - K2 \cdot W \tag{4}$$

where K2 is a negative constant, and I20 represents the current amount necessary for the separation of the ball 147 of the armature 146 from the seat portion 149.

More specifically, in the step 350, the subtraction of K2·W from the current value I20 is to calculate the current amount I2 of the coil 132 for the separation of the ball 147 from the seat portion 149 by a predetermined amount corresponding to the strength of the locking tendency of the wheel 6. In other words, the discharge speed of the oil from the wheel-braking cylinder 8 into the reservoir 12, i.e., the pressure-decreasing speed of the braking hydraulic is controlled by enlarging the flow area of the hydraulic passage 10 in accordance with the strength of the locking tendency of the wheel 6. Further, in the step 340, the setting of the energizing current amount I1 to the coil 32 of the restriction adjusting valve 16 to I100 is because it is not required to supply the oil into the wheel-braking cylinder 8 by opening the hydraulic passage 10 in the case that the wheel 6 is in the locking tendency. That is, in the restriction adjusting valve 16 the ball 47 surely comes into contact with the seat portion 49 in the case that the coil 32 is energized with the current value I100 greater than the current value I10, and hence in the step 340 the hydraulic passage 10 is shut by setting the current value I1 to the current value I100.

After the calculation of the current amounts I1 and I2 to be supplied to the coils 32 and 132 of the restriction adjusting valves 16 and 18, a step 360 is then executed so as to energize the coils 32 and 132 of the restriction adjusting valves 16 and 18 with the calculated current amounts I1 and I2, thereby driving the respective restriction adjusting valves 16 and 18.

As described above, in this embodiment, the restriction adjusting valves 16 and 18 are respectively provided in the high-pressure side hydraulic passage 10 for supplying the oil to the wheel-braking cylinder 8 and the low-pressure side hydraulic passage 14 for discharging the oil from the wheel-braking cylinder 8, and therefore, at the time of anti-skid control execution, it is possible to control the pressure-increasing and pressure-decreasing speeds of the braking hydraulic pressure in accordance with the strength of the locking tendency of the wheel 6. This allows suppressing the oil shock which can occurs at the time of the control execution, thereby preventing the discomfort sensation to the vehicle driver.

Figure 5:
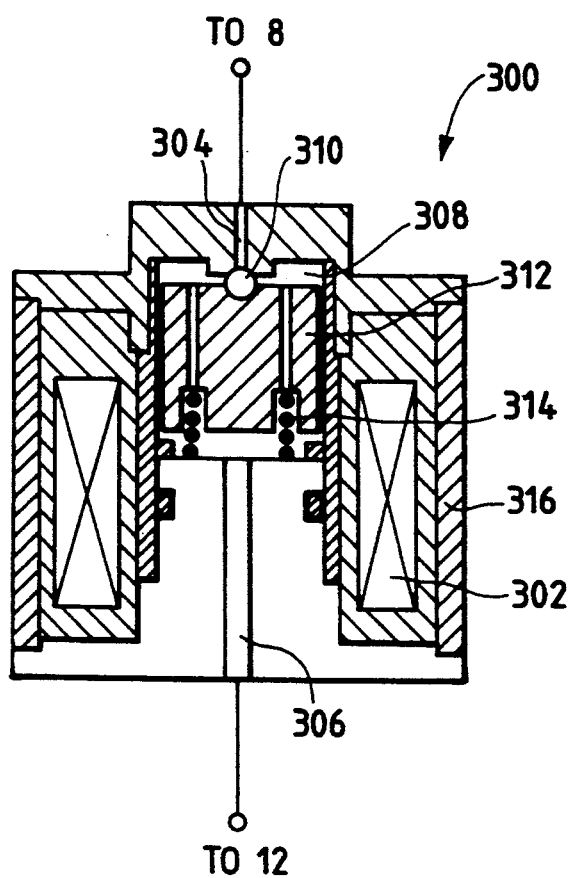
FIG. 5 is a cross-sectional view showing an arrangement of a pressure control valve to be used in another embodiment of this invention.

Here, although in the above-described embodiment the anti-skid control system is equipped with the restriction adjusting valves 16 and 18 respectively provided in the high-pressure side and low-pressure side hydraulic passages 10 and 14, it is appropriate to provide a pressure control valve 300, such as arranged to be illustrated in FIG. 5, in the low-pressure side hydraulic passage 14 so as to adjust the braking pressure in the wheel-braking cylinder 8 by the pressure control valve 300. In such an arrangement, in the case of increasing the braking pressure in the wheel-braking cylinder 8, drive signals (current signals are supplied to both the restriction adjusting valve 16 provided in the high-pressure side hydraulic passage 10 and the pressure control valve 300 provided in the low-pressure side hydraulic passage 14. Thus, the pressure of the braking oil supplied through the restriction adjusting valve 16 to the wheel-braking cylinder 8 is adjustable to a desired braking pressure by means of the pressure control valve 300. In addition, in accordance with the braking pressure in the wheel-braking cylinder 8 approaching the target pressure most suitable for the suppression of the wheel slip, the flow area of the restriction adjusting valve 16 is arranged to further decrease. With this arrangement, it is possible to reduce the quantity of the braking liquid to be discharged to the reservoir 12, and it is also possible to control the braking pressure itself in the wheel-braking cylinder 8 when the braking pressure in the wheel-braking cylinder 8 is increasing. On the other hand, in the case of decreasing the braking pressure in the wheel-braking cylinder 8, with the drive signal being supplied only to the pressure control valve 300, it is possible to reduce the braking pressure down to a desirable pressure. The above-mentioned target pressure is calculated on the basis of the wheel slip ratio, wheel acceleration and others and updated at every predetermined period.

The pressure control valve 300 is arranged such that the high-pressure side (i.e., wheel-braking cylinder 8 side) hydraulic pressure is continuously controllable in accordance with the energization current value to the coil 302. More specifically, the pressure control valve 300 is equipped with an oil chamber 308 respectively communicated through communication holes 304 and 306 with the wheel-braking cylinder 8 side hydraulic passage 14 and the reservoir 12 side hydraulic passage 14, an armature 312 provided in the oil chamber 308 and having a ball 310 for opening and closing the opening end portion of the wheel-braking cylinder 8 side communication hole 304, and a spring 314 for biasing the armature 312 toward the communication hole 304 side. With this arrangement, the armature 312 can be biased in a direction opposite to the biasing direction of the spring 314 by means of the electromagnetic force generated by energizing a coil 302 disposed in a housing 316 for constituting the oil chamber 308. As a result, it is possible to adjust the braking pressure in the wheel-braking cylinder 8 by controlling the current value for the energization of the coil 302.

Further, although this embodiment has been described in terms of the anti-skid control system, this invention is not limited to the anti-skid control system, but is applicable to braking control systems such as a traction control system for suppressing the acceleration slip of the motor vehicle by controlling the braking pressure at the time of the vehicle accelerating operation It should be understood that the foregoing relates to only preferred embodiments of the present invention, and that it is intended to cover all changes and modifications of the embodiments of the invention herein used for the purposes of the disclosure, which does not constitute departures from the spirit and scope of the invention.

What is claimed is:

1. A brake control system for a motor vehicle which is equipped with a running state detecting means for detecting a running state of said motor vehicle to adjust a braking pressure in a wheel-braking cylinder of said motor vehicle in accordance with said detected vehicle running state, said brake control system comprising:

a restriction adjusting valve provided between a hydraulic pressure generating source and said wheel-braking cylinder for receiving a braking liquid from said hydraulic pressure generating source and for adjusting an outflow of said received braking liquid to said wheel-braking cylinder, said restriction adjusting valve having a first communication hole through which said received braking liquid flows, an oil chamber, a sliding member slidably received in said oil chamber for variably changing an area of said first communication hole from a maximum to a minimum, position changing means for changing a position of said sliding member in accordance with first control signals, and pressure compensation means, cooperating with said oil chamber and formed in a housing of said restriction adjusting valve, for cancelling a pressure applied to said sliding member by said received braking liquid;

pressure control valve provided between said wheel-braking cylinder and a reservoir for allowing outflow of braking liquid from said wheel-braking cylinder to said reservoir to adjust a braking pressure in said wheel-braking cylinder; and control means for adjusting braking pressure in said wheel-braking cylinder by outputting said first control signals to said position changing means of said restriction adjusting valve to change said first communication hole area and outputting second control signals to said pressure control valve based on said detected vehicle running state.

2. A restriction adjusting valve comprising:
   a housing having a first communication hole into which an operating oil flows, an introduction passage into which said operating oil is introduced and a second communication hole from which said operating oil flows out;
   a sliding member provided inside said housing to be slidable and having a valve body for opening and closing an end portion of said first communication hole, said sliding member being slidably received in said introduction passage and said sliding member having a pressure-receiving portion which receives said operating oil introduced into said introduction passage, said sliding member being arranged between said first communication hole and said introduction passage;
   a spring member for biasing said sliding member in a biasing direction whereby said valve body opens said end portion of said first communication hole; and
   electromagnetic force generating means for generating an electromagnetic force in correspondence with an energization current value, said electromagnetic force biasing said valve body in an energized direction opposite to said biasing direction;
   said sliding member being biased in said energized direction to close said first communication hole via said valve body due to said operating oil applied to said sliding member via said introduction passage.

3. A restriction adjusting valve provided in a hydraulic line from a high-pressure side to a low-pressure side for controlling a flow passage area of said hydraulic line, said restriction adjusting valve comprising:
   a housing having an oil chamber communicating with said low-pressure side of said hydraulic line, said housing further having a first communication hole and an introduction passage each establishing communication between said oil chamber and said high-pressure side of said hydraulic line;
   an armature having a slide member slidably received in said introduction passage, said armature further having a valve body for opening and closing, from a side of said oil chamber, an open end of said first communication hole, said armature being disposed substantially between said first communication hole and said introduction passage;
   a biasing member for biasing said armature in a first direction that said valve body closes said open end of said first communication hole;
   electromagnetic force generating means for generating an electromagnetic force in correspondence with an energization current value, said electromagnetic force biasing said armature in a second direction opposite to said first direction of said biasing member;
   said armature being biased in said first direction to close said first communication hole via said valve body due to a hydraulic pressure applied to said slide member from said high-pressure side of said hydraulic line via said introduction passage; and
   an area, on said slide member, which receives hydraulic pressure applied from said high-pressure side of said hydraulic line via said introduction passage being set equal to an area, on said valve body, which receives hydraulic pressure applied from said high-pressure side of said hydraulic line via said first communication hole when said valve body closes said open end of said first communication hole.

4. A brake control system for a motor vehicle, comprising:
   a restriction adjusting valve provided at least in one of hydraulic lines from a hydraulic pressure generating source to a wheel-braking cylinder and from said wheel-braking cylinder to a reservoir, said restriction adjusting valve comprising:
   a housing having an oil chamber communicating with a low-pressure side of said hydraulic line, said housing further having a first communication hole and an introduction passage each establishing communication between said oil chamber and a high-pressure side of said hydraulic line;
   an armature having a slide member slidably received in said introduction passage, said armature further having a valve body for opening and closing, from a side of said oil chamber, an open end of said first communication hole, said armature being disposed substantially between said first communication hole and said introduction passage;
   a biasing member for biasing said armature in a first direction;
   electromagnetic force generating means for generating an electromagnetic force in correspondence with an energization current value, said electromagnetic force biasing said armature in a second direction opposite to said first direction of said biasing member;
   said armature being biased to close said first communication hole via said valve body due to a hydraulic pressure applied to said slide member from said high-pressure side of said hydraulic line via said introduction passage;
   an area, on said slide member, which receives hydraulic pressure applied from said high-pressure side of said hydraulic line via said first communication hole being set equal to an area, on said valve body, which receives hydraulic pressure applied from said high-pressure side of said hydraulic line via said introduction passage when said valve body closes said open end of said first communication hole; and
   said energization current value being controlled according to an external command for adjusting a flow passage area provided at said open end of said first communication hole to increase and decrease a hydraulic braking pressure in said wheel-braking cylinder.

5. A brake control system for a motor vehicle according to claim 4, wherein said biasing member for biasing said armature in a first direction opens said open end of said first communication hole.

6. A brake control system for a motor vehicle according to claim 4, wherein said biasing member for biasing said armature in a first direction closes said open end of said first communication hole.

7. A restriction adjusting valve comprising:
   a housing having a first communication hole into which an operating oil flows, an introduction passage into which said operating oil is introduced and a second communication hole from which said operating oil flows out;

a sliding member provided inside said housing to be slidable and having a valve body for opening and closing an end portion of said first communication hole, said sliding member being slidably received in said introduction passage and said sliding member having a pressure-receiving portion which receives said operating oil introduced into said introduction passage, said sliding member being arranged between said first communication hole and said introduction passage;

a spring member for biasing said sliding member in a biasing direction whereby said valve body closes said end portion of said first communication hole; and electromagnetic force generating means for generating an electromagnetic force in correspondence with an energization current value, said electromagnetic force biasing said valve body in an energized direction opposite to said biasing direction;

said sliding member being biased in said biasing direction to close said first communication hole via said valve body due to said operating oil applied to said sliding member via said introduction passage.

8. A restriction adjusting valve provided in a hydraulic line from a high-pressure side to a low-pressure side for controlling a flow passage area of said hydraulic line, said restriction adjusting valve comprising:

a housing having an oil chamber communicating with said low-pressure side of said hydraulic line, said housing further having a first communication hole and an introduction passage each establishing communication between said oil chamber and said high-pressure side of said hydraulic line;

an armature having a slide member slidably received in said introduction passage, said armature further having a valve body for opening and closing, from a side of said oil chamber, an open end of said first communication hole, said armature being disposed substantially between said first communication hole and said introduction passage;

a biasing member for biasing said armature in a first direction that said valve body opens said open end of said first communication hole;

electromagnetic force generating means for generating an electromagnetic force in correspondence with an energization current value, said electromagnetic force biasing said armature in a second direction opposite to said first direction of said biasing member;

said armature being biased in said second direction to close said first communication hole via said valve body due to a hydraulic pressure applied to said slide member from said high-pressure side of said hydraulic line via said introduction passage; and an area, on said slide member, which receives hydraulic pressure applied from said high-pressure side of said hydraulic line via said first communication hole being set equal to an area, on said valve body, which receives hydraulic pressure applied from said high-pressure side of said hydraulic line via said introduction passage when said valve body closes said open end of said first communication hole.

* * * * *